US012643472B2

(12) United States Patent
 Takeguchi

(10) Patent No.: US 12,643,472 B2
(45) Date of Patent: Jun. 2, 2026

(54) IN-VEHICLE CAMERA SETTING METHOD

(71) Applicant: TOYOTA JIDOSHA KABUSHIKI KAISHA, Aichi (JP)

(72) Inventor: Satoshi Takeguchi, Shinshiro (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/951,647

(22) Filed: Nov. 19, 2024

(65) Prior Publication Data

US 2025/0178533 A1 Jun. 5, 2025

(30) Foreign Application Priority Data

Dec. 1, 2023 (JP) ................................. 2023-204095

(51) Int. Cl.
 *B60R 1/22* (2022.01)
(52) U.S. Cl.
 CPC ............ *B60R 1/22* (2022.01); *B60R 2300/40* (2013.01)

(58) Field of Classification Search
 CPC .............................. B60R 1/22; B60R 2300/40
 See application file for complete search history.

(56) References Cited

U.S. PATENT DOCUMENTS

2002/0040261 A1 4/2002 Nakamoto et al.
2022/0070386 A1* 3/2022 Dworakowski ......... G06F 21/64

FOREIGN PATENT DOCUMENTS

| JP | 2002-108835 A | 4/2002 |
| JP | 2020-027665 A | 2/2020 |
| JP | 2020-027666 A | 2/2020 |
| JP | 2020-027667 A | 2/2020 |

* cited by examiner

*Primary Examiner* — Howard D Brown, Jr.
*Assistant Examiner* — Tyler B Edwards
(74) *Attorney, Agent, or Firm* — HAUPTMAN HAM, LLP

(57) ABSTRACT

There is provided a method according to the present disclosure is an in-vehicle camera setting method for setting an in-vehicle camera connected to an ECU of a vehicle. The in-vehicle camera setting method includes connecting the in-vehicle camera to the ECU of the vehicle; and writing individual vehicle setting information stored in the ECU into the in-vehicle camera.

9 Claims, 4 Drawing Sheets

*Fig.4*

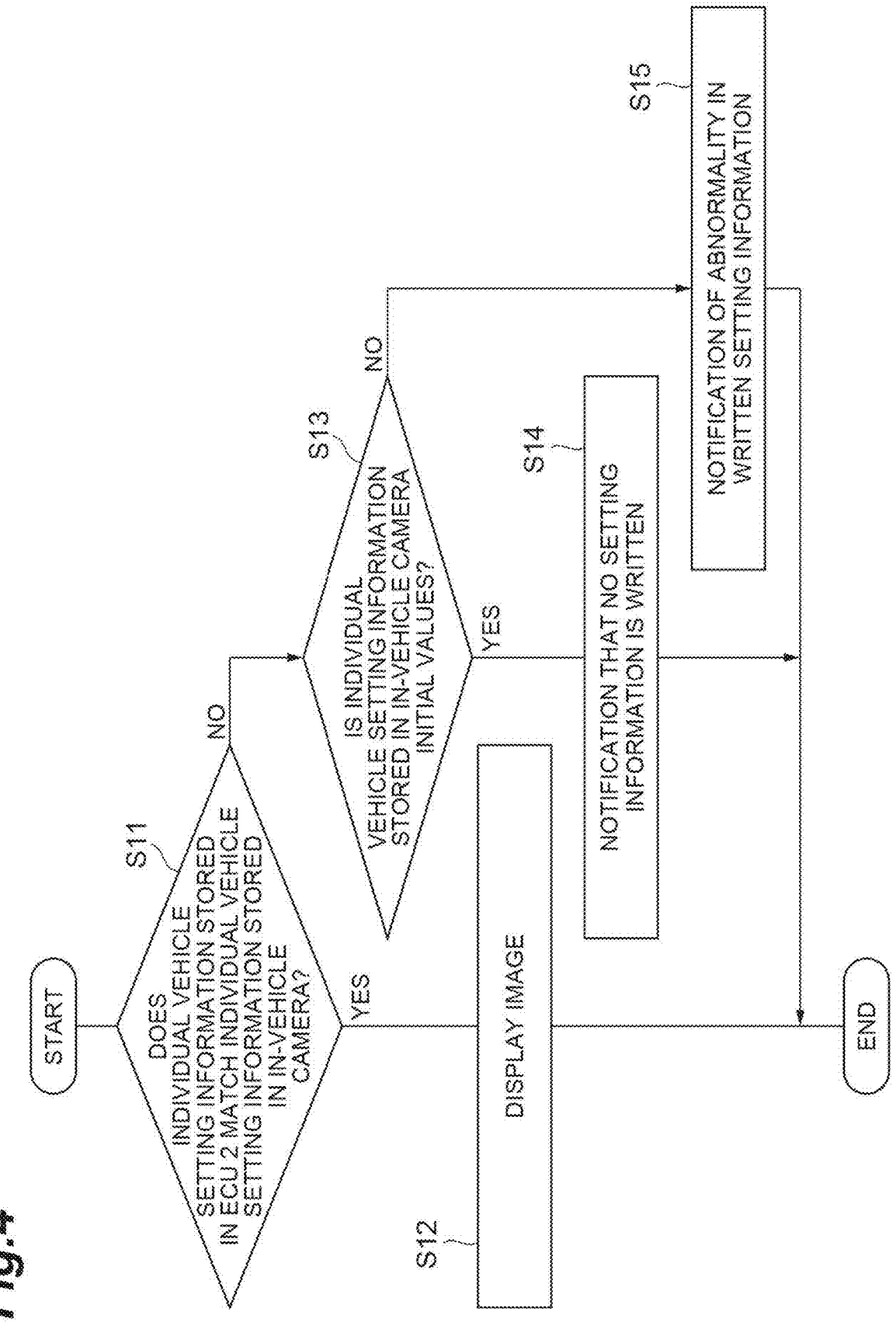

START

S11 — DOES INDIVIDUAL VEHICLE SETTING INFORMATION STORED IN ECU 2 MATCH INDIVIDUAL VEHICLE SETTING INFORMATION STORED IN IN-VEHICLE CAMERA?

NO

S13 — IS INDIVIDUAL VEHICLE SETTING INFORMATION STORED IN IN-VEHICLE CAMERA INITIAL VALUES?

NO

S15 — NOTIFICATION OF ABNORMALITY IN WRITTEN SETTING INFORMATION

YES

S14 — NOTIFICATION THAT NO SETTING INFORMATION IS WRITTEN

YES

S12 — DISPLAY IMAGE

END

IN-VEHICLE CAMERA SETTING METHOD

CROSS-REFERENCE TO RELATED APPLICATIONS

This application is based upon and claims the benefit of priority from Japanese Patent Application No. 2023-204095, filed on Dec. 1, 2023, the entire contents of which are incorporated herein by reference.

TECHNICAL FIELD

The present disclosure relates to an in-vehicle camera setting method.

BACKGROUND

Japanese Unexamined Patent Publication No. 2020-27667 is known as a technical document regarding the rewriting of a program of a device mounted in a vehicle. This publication discloses a technique for appropriately controlling the switching from an old program to a new program when a plurality of devices are to be rewritten.

SUMMARY

Incidentally, there is a case where a common hardware configuration is required for in-vehicle cameras mounted in a plurality of vehicle models. In this case, since individual vehicle setting information for each vehicle model is written in advance in each in-vehicle camera, it is necessary to manage the correspondence between vehicle models and in-vehicle cameras based on product numbers and the like.

It is an object of the present disclosure to provide an in-vehicle camera setting method capable of reducing the cost of managing an in-vehicle camera.

An in-vehicle camera setting method according to the present disclosure is an in-vehicle camera setting method for setting an in-vehicle camera connected to an ECU of a vehicle, and includes: connecting the in-vehicle camera to the ECU of the vehicle; and writing individual vehicle setting information stored in the ECU into the in-vehicle camera.

According to the present disclosure, it is possible to provide an in-vehicle camera setting method capable of reducing the cost of managing the in-vehicle camera.

BRIEF DESCRIPTION OF THE DRAWINGS

FIG. 4 is a flowchart showing steps of image display in the vehicle shown in FIG. 1.

DETAILED DESCRIPTION

Hereinafter, an embodiment of the present disclosure will be described in detail with reference to the diagrams.

Figure 1:
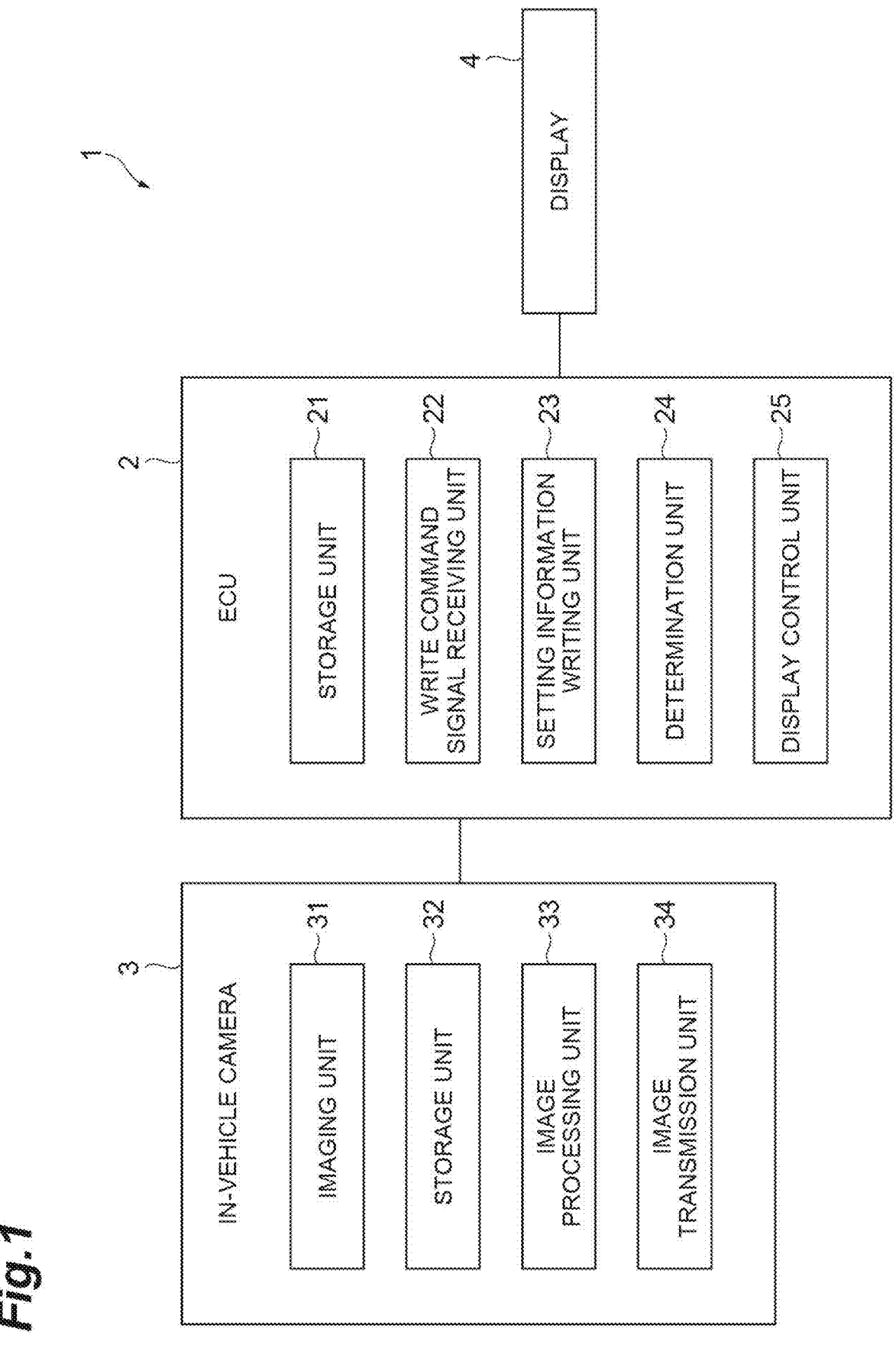
FIG. 1 is a block diagram of the functional configuration of a vehicle according to an embodiment.

FIG. 1 is a block diagram of the functional configuration of a vehicle according to the present embodiment. A vehicle 1 shown in FIG. 1 is, for example, an autonomous vehicle or a driving support vehicle. As shown in FIG. 1, the vehicle 1 includes an electronic control unit (ECU) 2, an in-vehicle camera 3, and a display 4.

The ECU 2 is an electronic control unit including a central processing unit (CPU) and a storage unit such as at least one of a read only memory (ROM) and a random access memory (RAM). In the ECU 2, for example, the CPU executes programs stored in the storage unit to realize various functions. The ECU 2 is mounted in the vehicle 1.

The in-vehicle camera 3 captures an image of the external environment of the vehicle 1. In the present embodiment, the in-vehicle camera 3 is at least one of a front camera that captures an image in front of the vehicle 1, a left camera that captures an image on the left side of the vehicle 1, a right camera that captures an image on the right side of the vehicle 1, and a rear camera that captures an image behind the vehicle 1. The in-vehicle camera 3 may be a monocular camera or a stereo camera. The in-vehicle camera 3 is connected to the ECU 2. The in-vehicle camera 3 transmits a captured image of the external environment of the vehicle 1 to the ECU 2.

The display 4 is provided, for example, on an instrument panel of the vehicle 1. The display 4 has a display screen for displaying an image. The display 4 displays an image on the display screen in response to a control signal from the ECU 2. In addition, the display 4 may be a head up display (HUD) that projects and displays an image on the windshield of the vehicle 1 or a projection screen.

The ECU 2 includes, as its functional components, a storage unit 21, a write command signal receiving unit 22, a setting information writing unit 23, a determination unit 24, and a display control unit 25.

The storage unit 21 stores the individual vehicle setting information of the in-vehicle camera 3. The individual vehicle setting information includes information such as a camera constant, a camera position, and a camera orientation. The individual vehicle setting information is determined based on at least one of the model of the vehicle 1, the fixing position of the in-vehicle camera 3 in the vehicle 1, and the method of fixing the in-vehicle camera 3.

The write command signal receiving unit 22 receives a write command signal transmitted from the outside of the vehicle 1. The write command signal is a trigger signal for writing the individual vehicle setting information stored in the storage unit 21 into the in-vehicle camera 3.

When the write command signal receiving unit 22 receives a write command signal, the setting information writing unit 23 reads out the individual vehicle setting information stored in the storage unit 21. The setting information writing unit 23 transmits the individual vehicle setting information read from the storage unit 21 to the in-vehicle camera 3.

The determination unit 24 determines whether or not the individual vehicle setting information stored in the in-vehicle camera 3 matches the individual vehicle setting information stored in the ECU 2. The determination unit 24 reads out the pieces of individual vehicle setting information stored in the in-vehicle camera 3 and the ECU 2, and then determines whether or not the pieces of individual vehicle setting information match each other. The determination unit 24 determines whether or not the individual vehicle setting information stored in the in-vehicle camera 3 is initial values. The display control unit 25 displays a display image transmitted from the in-vehicle camera 3 on the display 4.

The in-vehicle camera 3 includes, as its functional components, an imaging unit 31, a storage unit 32, an image processing unit 33, and an image transmission unit 34.

The imaging unit 31 includes, for example, a lens and a sensor. The imaging unit 31 captures an image of the external environment of the vehicle 1. The storage unit 32 stores the individual vehicle setting information transmitted from the ECU 2.

The image processing unit 33 generates a display image based on the image captured by the imaging unit 31 and the individual vehicle setting information stored in the storage unit 32. The display image is an image obtained by reflecting the individual vehicle setting information on the image captured by the imaging unit 31.

The image transmission unit 34 transmits the display image generated by the image processing unit 33 to the ECU 2. In this manner, the vehicle 1 performs image display based on the image captured by the in-vehicle camera 3 and the individual vehicle setting information of the in-vehicle camera 3.

Figure 2:
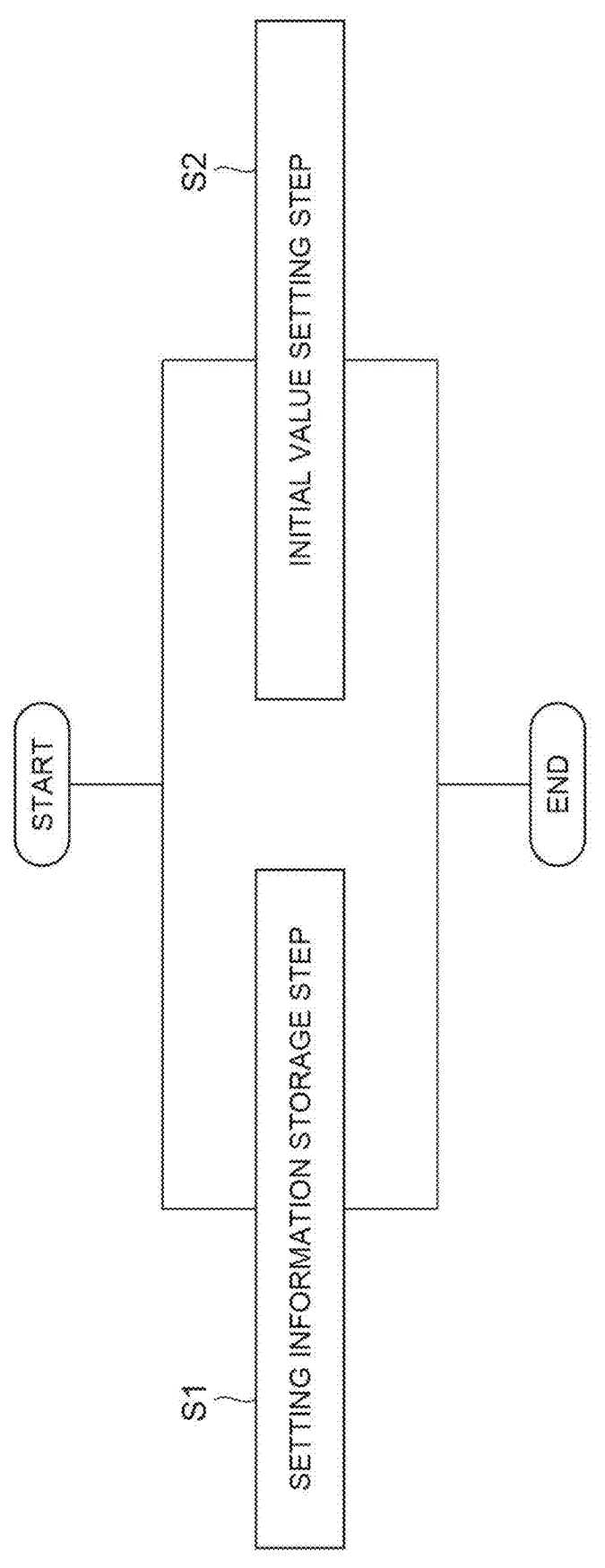
FIG. 2 is a flowchart showing steps of an in-vehicle camera setting method shown in FIG. 1.
Figure 3:
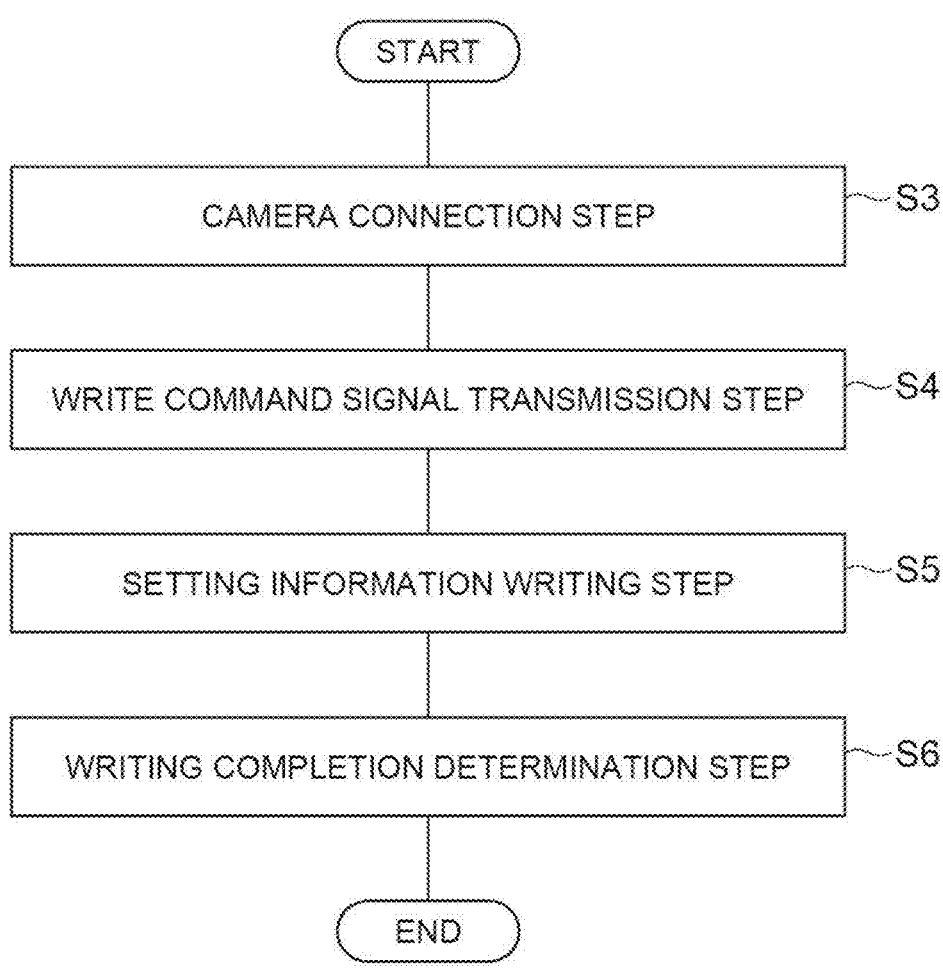
FIG. 3 is a flowchart showing steps of the in-vehicle camera setting method shown in FIG. 1.

Next, an example of an in-vehicle camera setting method will be described. FIGS. 2 and 3 are flowcharts showing steps of the in-vehicle camera setting method. As shown in FIGS. 2 and 3, the in-vehicle camera setting method includes a setting information storage step S1, an initial value setting step S2, a camera connection step S3, a write command signal transmission step S4, a setting information writing step S5, and a writing completion determination step S6.

In the setting information storage step S1, the individual vehicle setting information of the in-vehicle camera 3 is stored in the ECU 2. In the present embodiment, the setting information storage step S1 is performed before the ECU 2 is mounted in the vehicle 1. In the present embodiment, after the individual vehicle setting information is stored in the ECU 2 during the process of manufacturing the ECU 2, the ECU 2 in which the individual vehicle setting information is stored is mounted in the vehicle 1.

In the initial value setting step S2, the initial values of the individual vehicle setting information are written to the in-vehicle camera 3. In the initial value setting step S2, the initial values of the individual vehicle setting information are stored in the storage unit 32 of the in-vehicle camera 3. In the present embodiment, the initial value setting step S2 is executed before the in-vehicle camera 3 is mounted in the vehicle 1. In the present embodiment, after the initial values are stored in the in-vehicle camera 3 during the process of manufacturing the in-vehicle camera 3, the in-vehicle camera 3 in which the initial values are stored is mounted in the vehicle 1. In the present embodiment, the setting information storage step S1 is executed in a factory where the ECU 2 is manufactured, and the initial value setting step S2 is executed in a factory where the in-vehicle camera 3 is manufactured.

In the camera connection step S3, the in-vehicle camera 3 is connected to the ECU 2. In the camera connection step S3, the in-vehicle camera 3 in which the initial values are stored is fixed to a predetermined position on the vehicle 1. The in-vehicle camera 3 is connected to the vehicle 1. The in-vehicle camera 3 can communicate with the ECU 2.

In the write command signal transmission step S4, a write command signal is transmitted to the ECU 2 mounted in the vehicle 1. In the write command signal transmission step S4, a write command signal is transmitted from the outside of the vehicle 1 to the ECU 2. The write command signal transmission step S4 is executed, for example, during the process of inspecting the vehicle 1.

In the setting information writing step S5, when a write command signal is transmitted to the ECU 2 from the outside of the vehicle 1, the individual vehicle setting information stored in the ECU 2 is written to the in-vehicle camera 3. In the setting information writing step S5, the individual vehicle setting information stored in the storage unit 21 of the ECU 2 is stored in the storage unit 32 of the in-vehicle camera 3.

In the writing completion determination step S6, after the setting information writing step S5, it is determined whether or not the writing of the individual vehicle setting information into the in-vehicle camera 3 has been completed. In the writing completion determination step S6, when the individual vehicle setting information stored in the in-vehicle camera 3 matches the individual vehicle setting information stored in the ECU 2, it is determined that the writing of the individual vehicle setting information into the in-vehicle camera 3 has been completed. In the writing completion determination step S6, when the individual vehicle setting information stored in the in-vehicle camera 3 is initial values, it is determined that the writing of the setting information into the in-vehicle camera 3 has not been completed.

In the present embodiment, the camera connection step S3, the write command signal transmission step S4, the setting information writing step S5, and the writing completion determination step S6 are performed in a factory where the vehicle 1 is manufactured.

Next, an example of processing by the ECU 2 of the vehicle 1 will be described. FIG. 4 is a flowchart showing steps of image display in the vehicle 1. The flowchart shown in FIG. 4 is executed after each step shown in FIG. 3 is completed. As shown in FIG. 4, in step S11, the ECU 2 determines whether or not the individual vehicle setting information stored in the ECU 2 matches the individual vehicle setting information stored in the in-vehicle camera 3.

When the individual vehicle setting information stored in the ECU 2 matches the individual vehicle setting information stored in the in-vehicle camera 3 (step S11: YES), the ECU 2 proceeds to step S12. When the individual vehicle setting information stored in the ECU 2 does not match the individual vehicle setting information stored in the in-vehicle camera 3 (step S11: NO), the ECU 2 proceeds to step S13.

In step S12, the ECU 2 displays a display image transmitted from the in-vehicle camera 3 on the display 4. In step S13, the ECU 2 determines whether or not the individual vehicle setting information stored in the in-vehicle camera 3 are initial values. When the individual vehicle setting information stored in the in-vehicle camera 3 are initial values (step S13: YES), the ECU 2 proceeds to step S14. When the individual vehicle setting information stored in the in-vehicle camera 3 are not initial values (step S13: NO), the ECU 2 proceeds to step S15.

In step S14, the ECU 2 executes a notification that no setting information is written. For example, the ECU 2 displays predetermined information on the display 4 as a notification that no setting information is written. In step S15, the ECU 2 executes a notification of an abnormality in written setting information. For example, the ECU 2 displays predetermined information on the display 4 as a notification of an abnormality in written setting information.

As described above, in the setting information writing step S5, the individual vehicle setting information stored in advance in the ECU 2 is written to the in-vehicle camera 3 in response to a write command signal. That is, after the in-vehicle camera 3 is connected to the ECU 2, the individual vehicle setting information is written to the in-vehicle camera 3. Therefore, it is possible to omit the identification of the in-vehicle camera 3 regardless of at least one of the model of the vehicle 1 and the fixing position and method of the in-vehicle camera 3. In addition, the in-vehicle camera setting method according to the present embodiment is advantageous for standardizing the in-vehicle camera 3 and improves the efficiency of manufacturing and/or inventory management, thereby contributing to overall cost reduction. Therefore, according to the in-vehicle camera setting method, individual vehicle settings for the in-vehicle camera 3 can be made even if the model number of the in-vehicle camera 3 is not strictly managed according to the vehicle model or the like. Therefore, it is possible to reduce the cost of managing the in-vehicle camera 3. In addition, compared with a known method of reflecting the individual vehicle setting information stored in the ECU 2 in the in-vehicle camera 3 each time the in-vehicle camera 3 is activated by turning on the ignition of the vehicle 1, images captured by the in-vehicle camera 3 are more quickly displayed on the display 4 at the time of startup.

In the camera connection step S3, the in-vehicle camera 3 with the initial values of the individual vehicle setting information written is connected to the ECU 2. Therefore, it is possible to standardize the in-vehicle camera 3 and to omit the identification of the in-vehicle camera 3.

In the setting information writing step S5, when a write command signal is transmitted to the ECU 2 from the outside of the vehicle 1, the individual vehicle setting information stored in the ECU 2 is written to the in-vehicle camera 3. Therefore, it is possible to appropriately write the individual vehicle setting information stored in the ECU 2 to the in-vehicle camera 3.

In the writing completion determination step S6, when the individual vehicle setting information stored in the in-vehicle camera 3 matches the individual vehicle setting information stored in the ECU 2, it is determined that the writing of the individual vehicle setting information into the in-vehicle camera 3 has been completed. Therefore, it is possible to reliably write the individual vehicle setting information into the in-vehicle camera 3.

While the embodiment of the present disclosure has been described above, the present disclosure is not limited to the above embodiment.

Although the setting information storage step S1 is executed in a factory where the ECU 2 is manufactured, the setting information storage step S1 may be executed in a factory where the vehicle 1 is manufactured. The in-vehicle camera setting method according to the present disclosure may be executed after the vehicle 1 is manufactured.

Although the in-vehicle camera setting method includes the setting information storage step S1 and the initial value setting step S2, the in-vehicle camera setting method may not include at least one of the setting information storage step S1 and the initial value setting step S2. The in-vehicle camera setting method may not include the writing completion determination step S6.

Although the ECU 2 in which the individual vehicle setting information is stored is mounted in the vehicle 1 after the individual vehicle setting information of the in-vehicle camera 3 is stored in the ECU 2, the individual vehicle setting information may be stored in the ECU 2 after the ECU 2 is mounted in the vehicle 1.

What is claimed is:

1. An in-vehicle camera setting method for setting an in-vehicle camera connected to an ECU of a vehicle, comprising:

connecting the in-vehicle camera, in which initial values of individual vehicle setting information are written, to the ECU of the vehicle;

writing, in response to a write command signal transmitted to the ECU from outside of the vehicle, individual vehicle setting information stored in the ECU into the in-vehicle camera to overwrite the initial values; and determining whether or not writing of the individual vehicle setting information into the in-vehicle camera has been completed after the writing, wherein, in the determining, in response to the individual vehicle setting information stored in the in-vehicle camera matching the individual vehicle setting information stored in the ECU, it is determined that the writing of the individual vehicle setting information to the in-vehicle camera has been completed, the writing is executed during a process of inspecting the vehicle, the connecting, the writing and the determining are performed in a factory where the vehicle is manufactured, and the individual vehicle setting information includes a camera constant, a camera position and a camera orientation, and is determined based on at least one of a model of the vehicle, a fixing position of the in-vehicle camera in the vehicle or a method of fixing the in-vehicle camera.

2. The in-vehicle camera setting method according to claim 1, wherein the individual vehicle setting information is determined based on the model of the vehicle, the fixing position of the in-vehicle camera in the vehicle and the method of fixing the in-vehicle camera.

3. An in-vehicle camera setting method for setting an in-vehicle camera connected to an ECU of a vehicle, comprising:

connecting the in-vehicle camera, in which initial values of individual vehicle setting information are written, to the ECU of the vehicle; and writing, in response to a write command signal transmitted to the ECU from outside of the vehicle, individual vehicle setting information stored in the ECU into the in-vehicle camera to overwrite the initial values, wherein the writing is executed during a process of inspecting the vehicle, the connecting and the writing are performed in a factory where the vehicle is manufactured, and the individual vehicle setting information includes a camera constant, a camera position and a camera orientation, and is determined based on at least one of a model of the vehicle, a fixing position of the in-vehicle camera in the vehicle or a method of fixing the in-vehicle camera.

4. The in-vehicle camera setting method according to claim 3, wherein the individual vehicle setting information is determined based on the model of the vehicle, the fixing position of the in-vehicle camera in the vehicle and the method of fixing the in-vehicle camera.

5. The in-vehicle camera setting method according to claim 4, further comprising, after the writing:

determining, by the ECU, whether or not the individual vehicle setting information stored in the ECU matches the individual vehicle setting information stored in the in-vehicle camera;

in response to determining that the individual vehicle setting information stored in the ECU matches the individual vehicle setting information stored in the in-vehicle camera, displaying, by the ECU, a display image transmitted from the in-vehicle camera on a display of the vehicle; and in response to determining that the individual vehicle setting information stored in the ECU does not match the individual vehicle setting information stored in the in-vehicle camera, determining, by the ECU, whether or not the individual vehicle setting information stored in the in-vehicle camera are the initial values, in response to determining that the individual vehicle setting information stored in the in-vehicle camera are the initial values, displaying, by the ECU, first predetermined information on the display as a first notification of that no setting information is written, and in response to determining that the individual vehicle setting information stored in the in-vehicle camera are not the initial values, displaying, by the ECU, second predetermined information on the display as a second notification of an abnormality in written setting information.

6. The in-vehicle camera setting method according to claim 5, further comprising:

omitting an identification of the in-vehicle camera, regardless of the model of the vehicle, the fixing position of the in-vehicle camera in the vehicle, and the method of fixing the in-vehicle camera.

7. An in-vehicle camera setting method for setting an in-vehicle camera connected to an ECU of a vehicle, comprising:

storing individual vehicle setting information of the in-vehicle camera in the ECU;

storing initial values of the individual vehicle setting information in a storage of the in-vehicle camera;

mounting the in-vehicle camera in the vehicle after storing the initial values of the individual vehicle setting information in the in-vehicle camera;

connecting the in-vehicle camera to the ECU of the vehicle;

transmitting a write command signal from outside of the vehicle to the ECU;

transmitting, in response to the write command signal transmitted to the ECU, the individual vehicle setting information stored in the ECU to the in-vehicle camera; and overwriting the initial values of the individual vehicle setting information stored in the in-vehicle camera with the individual vehicle setting information transmitted from the ECU, wherein the overwriting is executed during a process of inspecting the vehicle, except the storing of the initial values of the individual vehicle setting information in the storage of the in-vehicle camera, the method is performed in a factory where the vehicle is manufactured, and the individual vehicle setting information includes a camera constant, a camera position and a camera orientation, and is determined based on a model of the vehicle, a fixing position of the in-vehicle camera in the vehicle, and a method of fixing the in-vehicle camera.

8. The in-vehicle camera setting method according to claim 7, further comprising, after the overwriting:

determining, by the ECU, whether or not the individual vehicle setting information stored in the ECU matches the individual vehicle setting information stored in the in-vehicle camera;

in response to determining that the individual vehicle setting information stored in the ECU matches the individual vehicle setting information stored in the in-vehicle camera, displaying, by the ECU, a display image transmitted from the in-vehicle camera on a display of the vehicle; and in response to determining that the individual vehicle setting information stored in the ECU does not match the individual vehicle setting information stored in the in-vehicle camera, determining, by the ECU, whether or not the individual vehicle setting information stored in the in-vehicle camera are the initial values, in response to determining that the individual vehicle setting information stored in the in-vehicle camera are the initial values, displaying, by the ECU, first predetermined information on the display as a first notification of that no setting information is written, and in response to determining that the individual vehicle setting information stored in the in-vehicle camera are not the initial values, displaying, by the ECU, second predetermined information on the display as a second notification of an abnormality in written setting information.

9. The in-vehicle camera setting method according to claim 8, further comprising:

omitting an identification of the in-vehicle camera, regardless of the model of the vehicle, the fixing position of the in-vehicle camera in the vehicle, and the method of fixing the in-vehicle camera.

* * * * *